US006663757B1

(12) United States Patent
Führ et al.

(10) Patent No.: US 6,663,757 B1
(45) Date of Patent: Dec. 16, 2003

(54) METHOD AND DEVICE FOR THE CONVECTIVE MOVEMENT OF LIQUIDS IN MICROSYSTEMS

(75) Inventors: Günter Führ, Berlin (DE); Torsten Müller, Berlin (DE); Thomas Schnelle, Berlin (DE); Rolf Hagedorn, Berlin (DE)

(73) Assignee: Evotec Technologies GmbH, Hamburg (DE)

( * ) Notice: Subject to any disclaimer, the term of this patent is extended or adjusted under 35 U.S.C. 154(b) by 0 days.

(21) Appl. No.: 09/868,199

(22) PCT Filed: Dec. 17, 1999

(86) PCT No.: PCT/EP99/10090

§ 371 (c)(1),
(2), (4) Date: Aug. 6, 2001

(87) PCT Pub. No.: WO00/37165

PCT Pub. Date: Jun. 29, 2000

(30) Foreign Application Priority Data

Dec. 22, 1998 (DE) .......................................... 198 59 461

(51) Int. Cl.[7] .......................... B01L 3/00; G01N 27/453
(52) U.S. Cl. ........................................ 204/450; 204/601
(58) Field of Search ................................ 204/450, 600, 204/601, 451

(56) References Cited

U.S. PATENT DOCUMENTS

| | | | | |
|---|---|---|---|---|
| 3,893,898 | A | 7/1975 | Candor | |
| 5,441,639 | A | 8/1995 | Noble et al. | |
| 6,447,727 | B1 * | 9/2002 | Parce et al. | 422/100 |

FOREIGN PATENT DOCUMENTS

| | | |
|---|---|---|
| JP | 56067537 | 6/1981 |
| SU | 516650 | 6/1977 |

OTHER PUBLICATIONS

Fuhr, Günter et al., "Pumping of Water Solutions in Microfabricated Electrohydrodynamic Systems" "*Micro Electro Mechanical Systems*", 1992, pp. 25–30.
Melcher, James R. et al., "Traveling Wave Bulk Electroconvection Induced Across a Temperature Gradient"; "*The Physics of Fluids*", 1967, pp. 1178–1185, vol. 10, Issue 6.

* cited by examiner

*Primary Examiner*—Arun S. Phasge
(74) *Attorney, Agent, or Firm*—Caesar, Rivise, Bernstein, Cohen & Pokotilow, Ltd.

(57) ABSTRACT

The aim of the invention is to convectively move at least one liquid in a channel of a microsystem which comprises a predetermined channel direction. To this end, the liquid is, in a partial section of the channel, subjected to an electric field gradient and optionally to a thermal gradient. The gradients are generated in the partial section corresponding to a predetermined field direction, whereby the field direction differs from the channel direction.

20 Claims, 8 Drawing Sheets

METHOD AND DEVICE FOR THE CONVECTIVE MOVEMENT OF LIQUIDS IN MICROSYSTEMS

The invention concerns processes for convective movement of static or flowing fluids in Microsystems, particularly for electroconvective or thermoconvective mixing of the fluids, and devices for implementation of the processes, particularly electrode arrangements in Microsystems for triggering convective fluid movements.

In numerous technical fields, particularly in chemical technology, the task of circulating or stirring a fluid or mingling or mixing several fluids frequently arises. For this purpose, fluid currents are generated which are, for example, mechanically circulated by means of mechanical barriers and/or actively movable elements. During the turbulent swirling, the fluid(s) is/are mutually interspersed. The Reynolds number of a fluid is important for the effectiveness of its circulation in a channel or container structure. For the mechanical mixing of fluids in a container structure, this Reynolds number must have a value over 1000. These values can only achieved in macroscopic systems, as the following estimation shows.

The Reynolds number of a channel can be estimated according to Re $=(\rho \cdot U \cdot L)/\eta$, with $\rho$ being the density of the fluid, $\eta$ being the dynamic viscosity of the fluid, U being the flow speed, and L being a characteristic channel dimension (e.g. radius of the channel cross-section). An aqueous solution with kinematic viscosity $\nu=\eta/\rho=1.6\cdot10^{-2}$ cm$^2$/s which flows through a channel with a radius r=25 $\mu$m at a speed U=500 $\mu$m/s, would, for example, result in a Reynolds number $R_e\approx0.008$, which is far below the required value of 1000 mentioned above. The mingling of fluids due to obstacles in the flow by means of flow mechanics is therefore restricted to macroscopic systems. The use of actively moving elements for the circulation of fluid is also restricted to macroscopic systems, because movable elements are subject to breakdown and can easily cause blockages or flow impediments in miniaturized systems.

The measurement and/or analysis systems of many biological, medical, and chemical technology applications have been miniaturized in the last decade for reasons of cost and resources and to achieve highly specific analyses. The problem of fluid circulation in Microsystems has, however, not yet been solved. Due to the low Reynolds number, even with flowing around, e.g., barriers which cross in a meander shape or sharp-edged flow obstructions, no turbulent flow can result. Therefore, if two fluids are introduced into a miniaturized channel (typical cross-section: 1 mm$^2$), no mixing of the fluids will result except through diffusion, even during flow through a channel length of several millimeters.

A generally known attempt to cause the circulation of flowing fluids in Microsystems consists of splitting a channel into a number of narrower channels and rejoining them with a changed relative arrangement. It is true that no movable parts are used hereby. However, the narrowed channels have a characteristic diameter which is smaller than the initial channel by a factor of 10 to 40. The flow resistance thereby increases and an acute danger of blockage arises. Usage for suspensions which contain particles such as biological cells or microbeads is excluded. In addition, only a quasi-blending corresponding to the number and rearrangement of the narrowed channels results.

Pumping fluids on the basis of electrohydrodynamic effects is also known. Traveling electric fields are generated in fluid channels with electrode systems which are affixed to opposing channel walls over the entire length of the channel. In combination with a temperature gradient which is directed from one of the electrode systems to the opposite electrode system, so-called electroconvection occurs, which effects a stationary fluid transport in the channel. These types of systems are, for example, described as traveling wave pumps or electrohydrodynamic pumps by J. R. Melcher et al. in "The Physics of Fluids", vol. 10, 1967, p. 1178 et seq. The mechanical fluid propulsion is caused in such a way that, due to the temperature gradients in the fluid, conductivity and/or dielectric constant gradients arise. Volume charges are thereby generated which exercise a propulsive force on the fluid by interacting with the traveling electric field.

The system described by J. R. Melcher et al. is a macroscopic system with a channel length of approximately 1 m and a typical channel cross-section of approximately 3 cm. It serves exclusively for the investigation of electrode convection and, due to the expensive measures for the production of the temperature gradients and for driving the electrodes over the entire length of the channel, does not allow for practical use.

Miniaturized traveling wave pumps are described by Fuhr et al. in "MEMS 92", 1992, p. 25. The implementation of the traveling wave principle in Microsystems has, however, not yet found practical application, because there are significantly simpler possibilities for fluid transport in microchannels and a contribution to the problems described above of fluid circulation in Microsystems has not been provided. Fluid circulation would specifically mean that the sum of the fluids circulating in a region of the Microsystems is zero. The conventional traveling wave pumps, however, always provide a net flow of solution. Directed pumping along the channel direction occurs in the microsystem. Mixing of fluids is not possible with the conventional traveling wave pumps.

It is the object of the invention to provide improved processes for convective movement of fluids in Microsystems, with which circulation or blending of fluids in microchannels is made possible without moving parts and without narrowing the channels, and with any desired channel cross-section. In particular, the object is to provide a process for effective fluid mixing in Microsystems which can also be used with suspensions containing microparticles. It is also the object of the invention to indicate devices for implementation of the process mentioned, particularly miniaturized fluid mixers.

According to a first aspect of the invention in particular, a new process for convective fluid movement in microsystems is created in which one or more fluids in the microsystem are subjected to traveling electric fields, alternating fields, or electrical field gradients having an alignment which deviates from a flow direction of the fluid in the microsystem and/or a preferred lengthwise alignment of a section of the microsystem (e.g. channel section). The alignment of the alternating fields (preferred direction of the field-generating electrodes), of the traveling electrical fields (direction of travel), or of the field gradients will be generally referred to in the following as the field direction. According to the invention, the field direction runs, e.g., perpendicular to the flow direction of the fluid and/or perpendicular to the channel alignment.

The convective fluid movement can be generated both in flowing fluids (transverse to the flow direction) and in static fluid volumes (e.g. in a closed part of the microsystem). The convective fluid movement is characterized by a closed fluid circulation. The sum of the flows caused in the region of the field gradients implemented according to the invention is zero. Thus, for example, flow loops are generated transverse to the direction of the channel which cause a swirling and mixing of the fluids involved. This is a surprising result, after free mixing of fluids in microsystems was thought to be impossible due to the reasons of flow mechanics described above.

The convective fluid movement is triggered according to the following principles. At the interface between two fluids with different dielectric constants (or conductivities), the field gradients lead to the appearance of polarization and force effects which lead to blending at the interface and at each new interface. In fluids or fluid mixtures with sufficient anisotropy of the dielectric properties or polarization properties, blending is achieved by the electrical field gradients alone. If the fluid is isotropic, electrical anisotropy must be artificially achieved by formation of a thermal gradient. The action of the thermal gradients will be explained with the following image. As the temperature changes in a fluid which is initially isotropic, gradients of the dielectric properties or polarization properties corresponding to the temperature gradients are also formed. The fluid can be viewed as a lamination of many dielectrically different fluids. The effects mentioned for the anisotropic fluids arise at the interfaces between the layers. The appearance of electrical polarization leads to mingling of the fluid.

According to a preferred embodiment of the invention, the formation of a thermal field gradient parallel to the field direction thereby occurs simultaneously with the generation of the electric fields. The thermal gradient is required in order to generate the anisotropy in the fluid which leads, together with the electrical field, to the fluid propulsion. In contrast to the conventional traveling wave pumps, a thermal gradient with a temperature difference between opposing channel walls of 0.5° to 1° is sufficient to generate the fluid circulation or cross-current according to the invention. A particular advantage of the invention is that this type of temperature difference can be achieved just by the application of electrical voltages for generating the electric fields to the electrode arrangements, so that separate generation of an external thermal gradient is not urgently necessary.

If the thermal gradient is externally generated, this is preferably done with optical irradiation. The region of the microsystem of interest, in which the electrical field gradients are implemented, is radiated with light of a suitable wavelength which is well absorbed in the respective fluid. The irradiation is preferably performed with a focused laser beam which, depending on the application, can be coupled from any desired side of the microsystem through transparent wall regions or using light guides. So-called "hot spots" are formed by the optically induced increase in temperature, which work together particularly effectively with the electrical field gradients to generate the convective fluid movement.

According to the invention, there is a predetermined difference in angle between the field direction and the direction of the current flow direction of the fluid and/or the flow direction before or after realization of the process. In the following, the concept of flow direction is generally used for the alignment of the fluid flow or for the alignment of the microsystem region in which the fluid flows. The angle between the field direction and the flow direction is preferably in the range from 60° to 120°. For values above 90°, this means that the field direction has a component which is opposite to the flow direction.

According to a further aspect of the invention, a fluid microsystem is provided having structures which are set up for fluid conduction or fluid accomodation and, in at least one predetermined section (swirling section), have an electrode arrangement for the formation of the traveling electric fields, electrical field gradients, or AC voltages corresponding to the desired field direction. The structures in the microsystem preferably have a characteristic cross-sectional dimension of less than 150 $\mu$m. Typically, a structure is implemented as a microchannel with a cross-sectional area of approximately 1 $mm^2$ (or less), e.g. cross-sectional dimensions of 100 $\mu m \cdot 100$ $\mu$m or less. The provision of swirling sections is possible in all types of Microsystems known per se. The application of electrode arrangements according to the invention to straight channels is preferred.

The subject of the invention is also an electrode arrangement affixed to at least one wall of a microchannel for the implementation of the field effects mentioned in a field direction deviating from the channel alignment. Because the thermal gradients are generated in the field direction simultaneously with the electrical driving, the electrode arrangement consists of electrode elements which have an asymmetrical or irregular shape relative to the field direction. This applies at least for the embodiment in which the electrical fields comprise electrical field gradients or AC voltages. If traveling electrical fields are used, asymmetry of the electrode elements is not necessary, because then the thermal field gradient can also be generated through delayed driving of the electrode elements.

The invention has the following advantages. For the first time, the convective fluid movement for the generation of fluid cross-currents and/or swirls in microchannels is realized. The electrode arrangements according to the invention have a simple and compact design. It is therefore sufficient if the swirling sections in the microsystem have a relatively small extension in the lengthwise direction of the channel, in the range approximately between a fifth of and one channel cross-sectional dimension. The fluid swirling according to the invention can be realized in both still and flowing fluids. An effective temperature gradient can be easily generated electrically with the electrode arrangements. The application of an additional, external temperature gradient is possible, but not urgently required. The invention is easily compatible with other microstructure technologies. Thus, the electrode arrangements can consist of electrodes which are essentially designed like electrodes for the generation of field barriers for dielectrophoretic manipulation. According to the invention, no moving parts are required.

BRIEF DESCRIPTION OF THE DRAWINGS

Further advantages and characteristics of the invention will become apparent from the following description of the attached drawings. These show.

For reasons of clarity, the invention will be described in the following with reference to exemplary embodiments in which the angle between the field direction and the flow direction is 90°. Implementation with different angle values is possible by appropriate adjustment of the electrode arrangements. For this purpose, the electrode arrangements are each aligned appropriately for the desired field effects.

Figure 1:
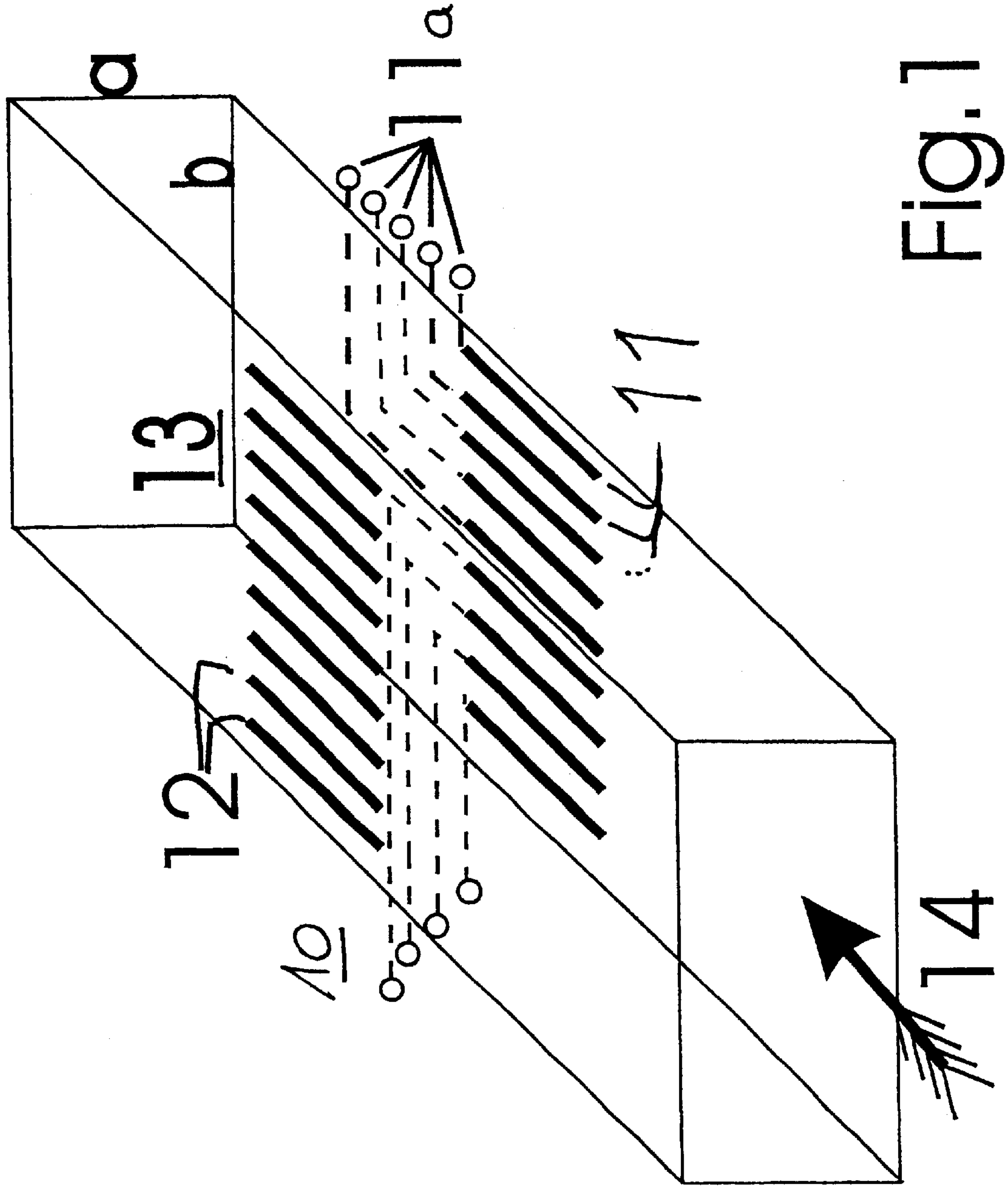
FIGS. 1 to 7 various embodiments of electrode arrangements according to the invention in microchannels shown in sections in schematic perspective view, and FIG. 8 an illustration for the use of the invention in fluid blending in DNA chips.

An enlarged perspective view of a section of a channel 13 in a microsystem is shown in FIG. 1. The channel 13 has a rectangular cross-section with dimensions a and b, which lie in the range from a few to a few hundred micrometers or even less. The upper limit for the dimensions a and b is approximately 1 mm. The walls of the channel 13 are referred to in the following as the bottom, cover, and side surfaces according to their location in the operating position. The channel 13 is part of a microsystem which, for example, essentially consists of plastic or a semiconductor material. The microsystem is preferably processed with methods from semiconductor technology on a substrate for formation of a microsystem chip.

The channel 13 is set up to have a fluid (solution or suspension) flow through it in the direction of the arrow 14. The flow direction 14 corresponds to the lengthwise extension of the channel 13. On the entrance side, the channel 13 is connected with other parts of the microsystem (not shown). In the implementation as a fluid mixer, several partial channels discharge into the channel 13 upstream relative to the swirling section 10, which is described in the following.

The swirling section 10 is formed by an electrode arrangement 11, 12 affixed to the channel walls. The electrode arrangement 11, 12 consists of two electrode groups which are affixed to opposing channel walls. For a rectangular channel cross-section (as shown), the electrode groups are, in order to achieve higher mixing effectiveness, preferably provided on the channel walls with the larger transverse width, i.e. in the present case on the bottom and cover surfaces. Alternatively, one or more electrode groups can also be affixed to the side surfaces or, depending on the application, to one or more of the bottom, cover, or side surfaces.

The electrode groups extend along the respective channel wall over the entire width of the channel and, in the flow direction 14, over the length of the swirling section, which is selected according to the application. The length can, for example, correspond to the channel width or be shorter than this (down to a fifth of the channel width). The electrode groups preferably have an equal dimension in the lengthwise direction of the channel (corresponding to the flow direction 14). Different dimensions can also, however, be provided, as is described below. The electrode groups are positioned, relative to the flow direction 14, opposite to one another or offset.

In the embodiment according to FIG. 1, each electrode groups consists of a number of lower electrode strips 11 on the bottom surface and/or upper electrode strips 12 on the cover surface of the channel 13. The electrode strips each have separate control lines. For reasons of clarity, only the control lines 11*a* of the lower electrode strips 11 are shown. The electrode strips can be driven individually or in groups (e.g. joint driving of every third electrode strip).

The electrodes strips have a planar shape, i.e. they are applied as layers on the respective channel wall, with a thickness which is significantly smaller than the channel height a. The channel cross-section is thus practically not narrowed by the electrodes. The electrode strips have a length corresponding to the length of the swirling section and a predetermined width and/or predetermined strip intervals. The strip width and the strip interval selected are in the range from approximately 1/20 to 1/5 of the channel height a or less. Depending on the application, it can be provided that the electrode strips have differing widths and differing strip intervals, as well as having differing shapes, because these characteristics influence the effectiveness of the fluid swirling. The electrode strips run lengthwise along the channel and are set up to generate a field effect transverse to the lengthwise channel direction (see below).

The electrodes preferably consist of an inert metal (e.g. gold, platinum, titanium) in all embodiments of the invention. The electrode strips and the associated control lines are advisably produced using the methods of semiconductor technology on the respective substrate surface.

The electrode groups are driven according to the invention with a control device (not shown) according to one or more of the following alternatives.

According to a first design, electrical traveling waves, as they are known from the traveling wave pumps mentioned above, are formed at the electrode strips. To generate a traveling wave, the electrode strips are driven in sequence in such a way that a field maximum moving transverse to the flow direction results. For this purpose, high frequency signals with a specific phase shift are applied to the electrode strips. The frequency of the high frequency signals approximately corresponds to the reciprocal value of the relaxation time of the charge carriers in the fluid and is in the range from kHz to MHz. According to a preferred embodiment, a traveling wave with at least three signals phase shifted to one another is generated. For example, four signals with an amplitude in the range of volts are provided, which are each phase-shifted by 90°.

According to a second design, electrical field gradients are constructed in the field direction slanted or transverse to the flow direction 14. The electrode strips have high frequency signals applied to them in phase, which nonetheless have an amplitude (e.g. in the range of 0.1 V to 100 V) varying from strip to strip (typically <20 V).

Figure 5:
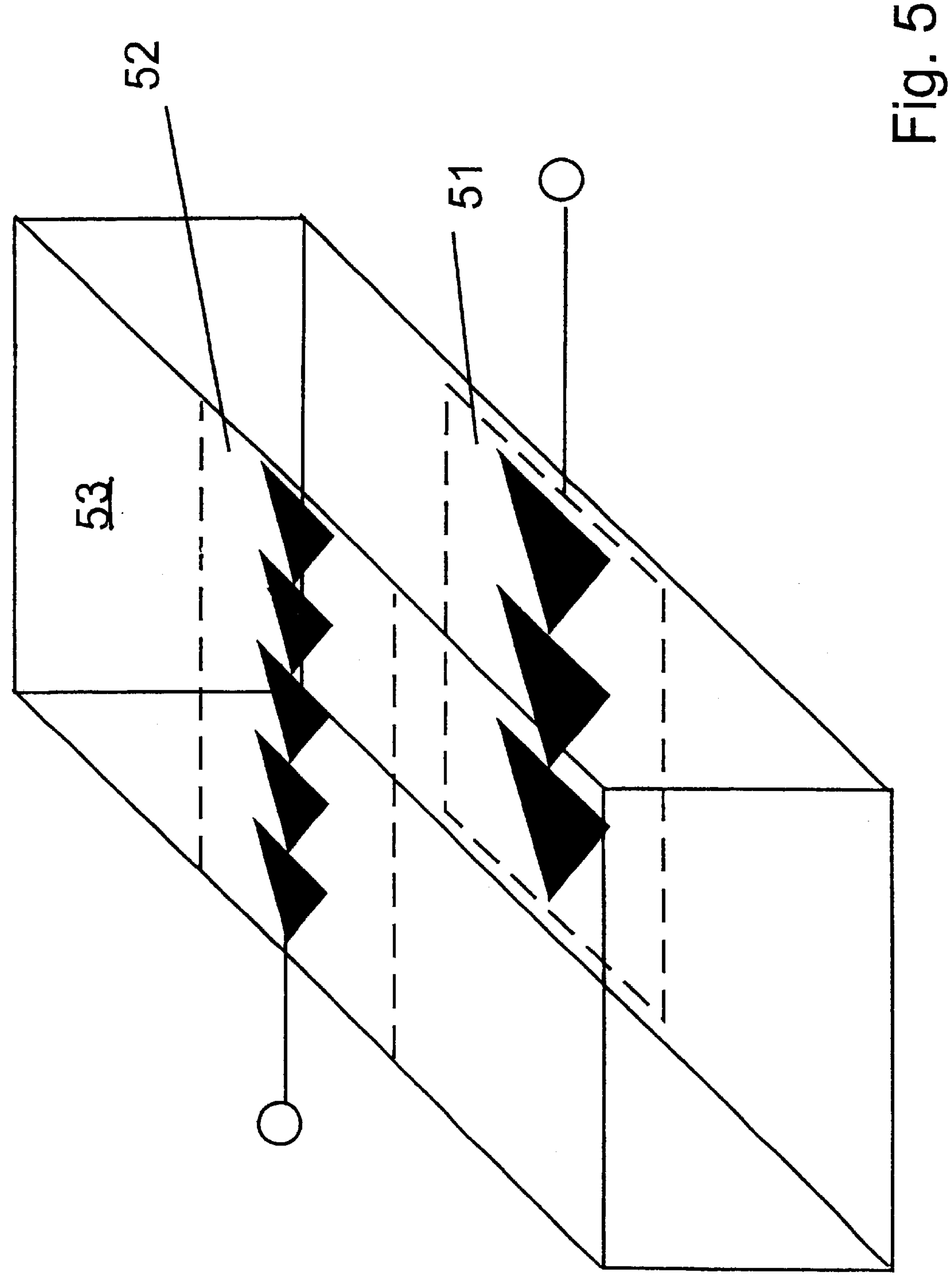

Finally, it is provided according to a further design that a high frequency AC voltage (amplitude in the range of volts) is applied to one or both of the electrode groups, as parts or in a unit, in order to achieve fluid crosscurrents or a fluid swirling in the swirling section. In this embodiment, all partial electrodes of the electrode groups are driven jointly, or the electrode groups each consist of only one joint electrode, which is nonetheless structured to generate the thermal gradients (cf. FIG. 5).

An electroconvective circulation of the fluid passing through the channel 13 occurs under the effect of electric fields according to the invention. A particular advantage of the invention is that the circulation of the fluid (e.g. mixing of several fluids) can be realized in flow operation at flow speeds of up to 1000 $\mu$m/s.

The generation of the swirling or the transverse and/or ring flows transverse or slanted to the alignment of the channel can be influenced by an additional temperature adjustment of the channel. If a temperature gradient is applied in the region of the swirling section transverse to the channel alignment, particularly by heating the cover surface or cooling the bottom surface of the channel 13, the swirling can be intensified. This is advantageous because, simultaneously to the temperature adjustment, reduction of the amplitude of the control signal is made possible.

Although FIG. 1 only shows one pair of electrode groups, multiple swirling sections with, correspondingly, multiple electrode groups can be provided in the lengthwise direction of the channel.

Figure 2:
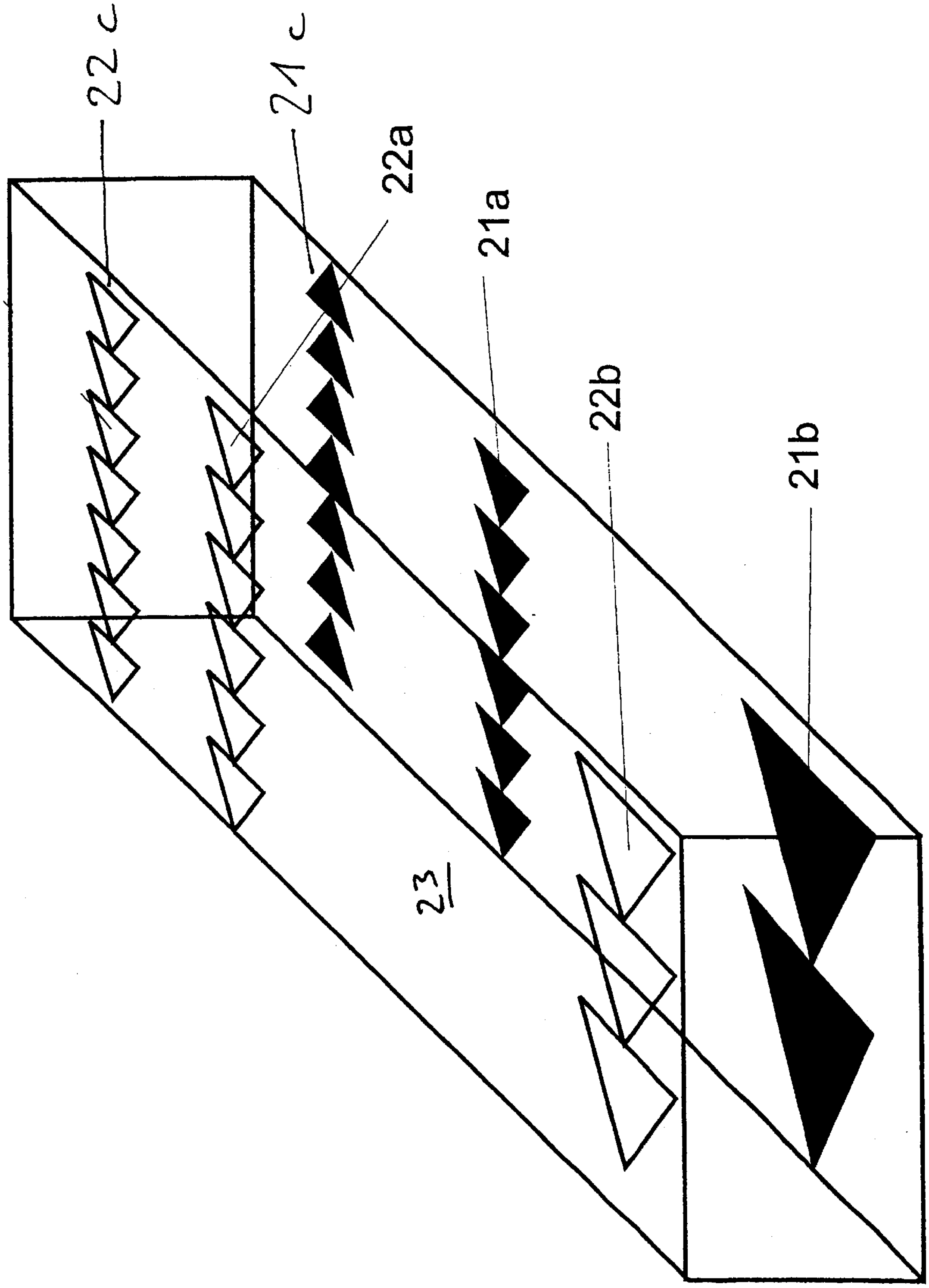

FIG. 2 shows further embodiments of electrode arrangements according to the invention, which again each consist of two electrode groups affixed to opposite channel walls. Each electrode group consists of triangular or arrow-shaped electrode elements arranged in a straight line. Lining up the elements forms a strip with an alignment corresponding to the desired field direction and slanted or transverse to the flow direction. The electrode elements are lined up in such a way that each triangle tip points toward a triangle side of the neighboring electrode element. In the channel 23, three pairs of electrode groups are shown. The electrode groups 21*a*, 22*a* are symmetrically designed, i.e. both electrode groups consists of electrode elements of the same size and orientation. The electrode groups 21*b*, 22*b* form an asymmetrical design, in which the electrode group 21*b* on the bottom surface has a smaller number of larger electrode elements than the electrode group 22*b*on the cover surface. The pair of electrode groups 21*c*, 22*c*, which each consist of electrode elements of equal size, but with a reversed orientation in regard to the triangle direction, show a further asymmetrical design.

In FIG. 2, the control lines of the individual electrode elements are not shown. The electrode elements are arranged electrically insulated from one another and thus can be driven separately or in groups. The driving of the electrode elements can be performed analogous to the driving of the strip electrodes according to FIG. 1.

Figure 3:
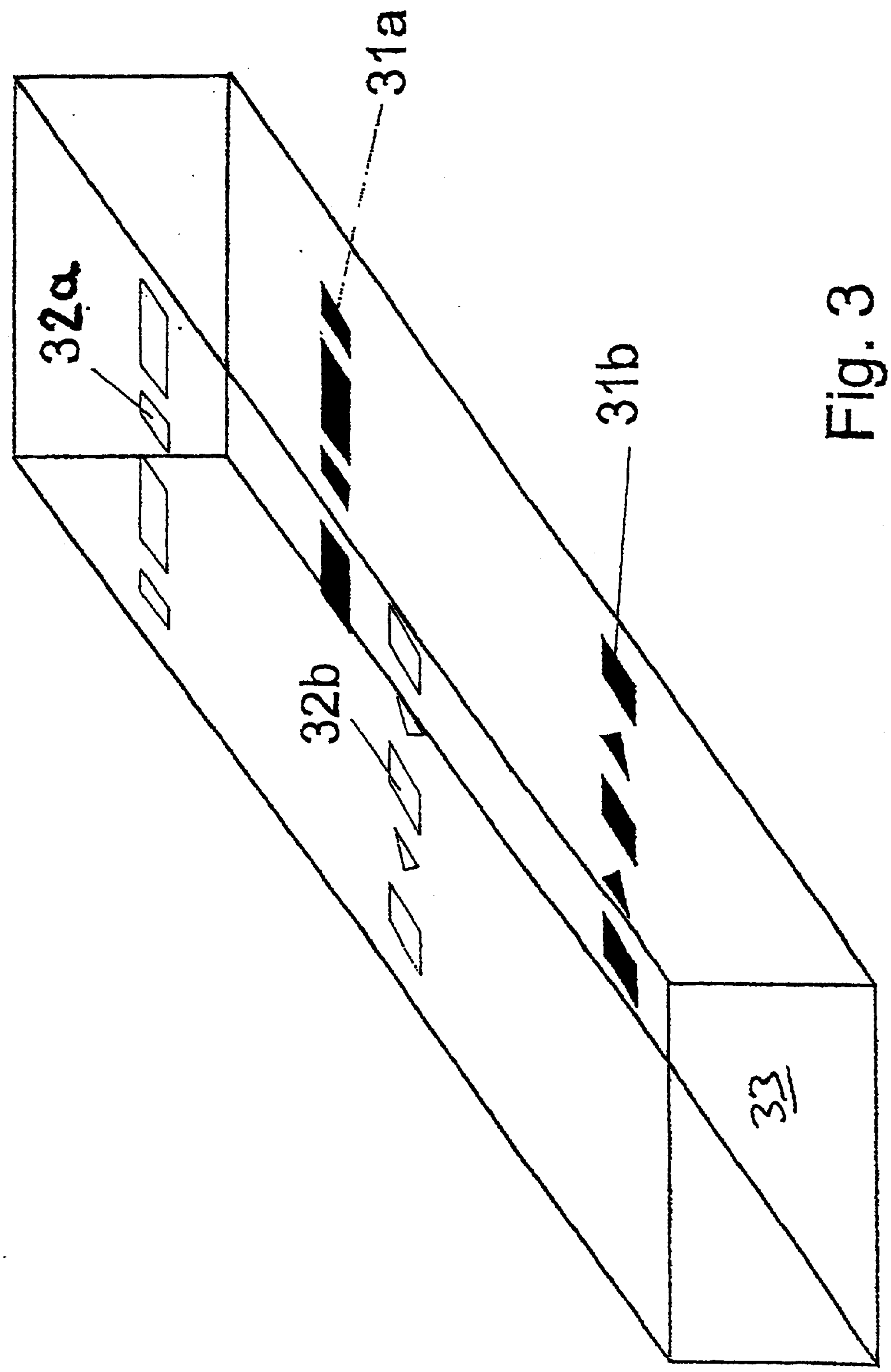

Further embodiments with irregular electrode shapes are depicted in FIG. 3. Again, an electrode arrangement according to the invention consists of two electrode groups which are affixed to opposing channel walls. Each electrode group consists of electrode elements arranged in a row which have flat, triangular, or rectangular shapes of various sizes. In the electrode groups 31*a*, 32*a*, the rectangular electrode elements of each electrode group each form a strip which is aligned in the desired field direction (in this case, e.g., perpendicular to the flow direction). In the electrode groups 31*b*, 32*b*, alternating rectangles and triangles are provided as the electrode elements, which are again arranged in a line to form a strip.

Both electrode arrangements according to FIG. 3 again represent asymmetrical arrangements. The arrangement of larger or smaller rectangular electrode elements and/or rectangular or triangular electrode elements provides an orientation of the respective strips. The orientations of the electrode groups 31*a*, 32*a* and/or 31*b*, 32*b* lying opposite to one another are each reversed relative to one another.

The strips formed by the electrode elements extend essentially over the entire width of the channel and typically have dimensions in the lengthwise direction of the channel like those of the electrode strips shown in FIG. 1.

To achieve specific field gradients, the shapes of the electrode elements can be altered depending on the application. Again, the electrode elements can be driven individually or in groups.

Figure 4:
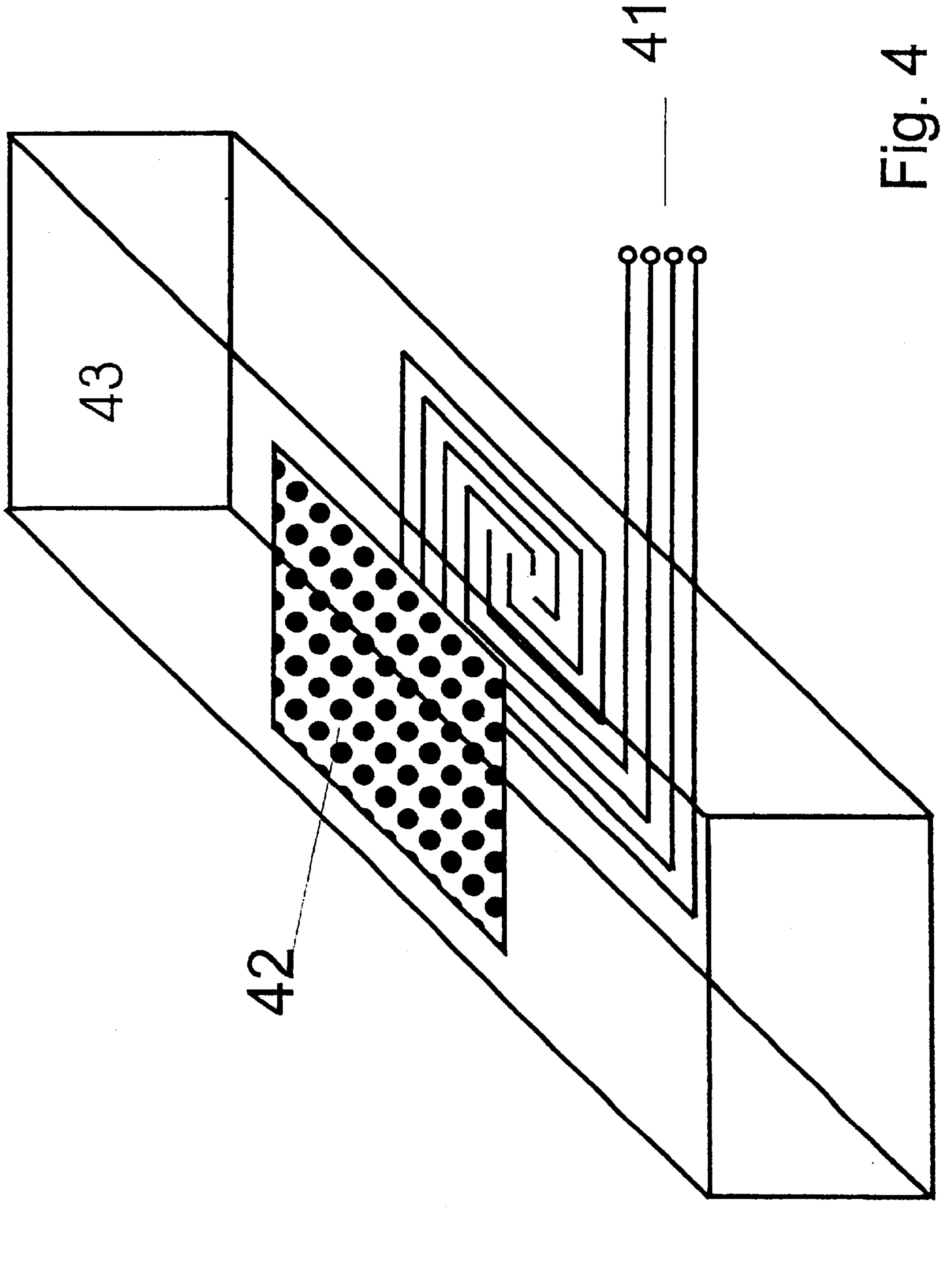

A further design of an electrode arrangement according to the invention is shown in FIG. 4. In channel 43, a meander-shaped electrode arrangement 41 is affixed to the bottom surface and a flat electrode 42 (indicated with dots) is affixed to the cover surface. The meander-shaped electrode group consists in the example depicted of four electrodes which are positioned, separated from one another, in a spiral shape around one another in the plane of the bottom surface. The flat electrode 42 forms a counterelectrode. Again, the electrode groups 41 are driven according to the principles explained with reference to FIG. 1. Applying four phase-shifted signals to the four electrodes is preferred. The flat electrode 42 can be replaced by a corresponding meander arrangement.

According to a further embodiment of the invention (cf. FIG. 5), an electrode arrangement is provided, in the micro-channel 53 with fluid flowing through it, consisting of two structured individual electrodes 51, 52. The individual electrodes 51, 52 are affixed to opposing channel walls analogous to the positioning of the electrode groups according to the embodiments described above. Each of the individual electrodes has a structuring, e.g., in the form of a line of triangular electrode elements (as shown), which, however, are connected electrically to one another, in contrast to the design according to FIG. 2. The electrode elements can also have other geometric shapes.

The production of the individual electrodes 51, 52 is performed either by processing the desired electrode surfaces on the respective bottom or cover surface by applying a coating corresponding to the desired shape of the electrode elements or by the covering technique described in the following. According to this, each individual electrode 51, 52 consists of a flat, rectangular electrode which extends over the entire width of the channel (shown with dashed lines). The electrode carries an insulation layer with cutouts corresponding to the desired shapes of the electrode elements. Only at these cutouts or openings is the electrode in direct contact with the fluid and it is thereby also only active according to this cutout pattern. The shape has the advantage that the electrode elements of the individual electrodes 51, 52 do not have to touch, because electrical contact is ensured via the electrode surface under the insulation layer.

FIG. 5 again shows an asymmetrical shape, in which the electrode elements of the lower individual electrode 51 are arranged in a row with fewer, but therefore larger, triangles than the electrode elements of the upper individual electrode 52.

Figure 6:
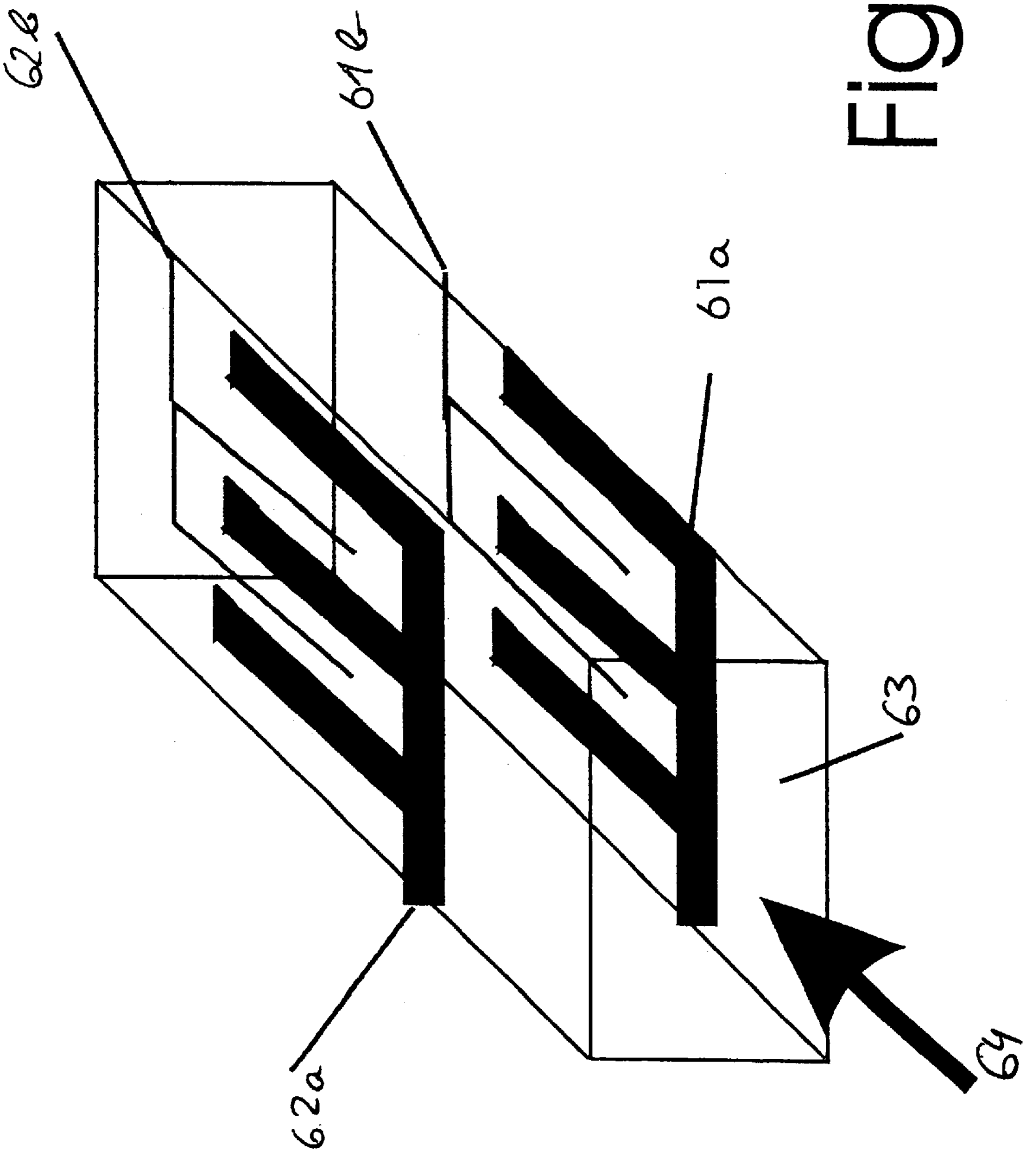

In the embodiment according to FIG. 6, the electrode arrangement according to the invention consists of two electrode groups 61*a*, 61*b* and/or 62*a*, 62*b* affixed to opposing channel walls, each consisting of two electrode strips meshing in one another like combs. The fluid flows through the channel 63 corresponding to the direction of the arrow 64 (or in the reverse direction). If the fluid is subjected to high frequency electric fields in the region of the electrode arrangement, then the desired electroconvective circulation transverse to the direction of the channel again results. The embodiment depicted comprises a total of four electrode strips, which are preferably driven in four phases with a high frequency alternating field. The electrode strips are positioned asymmetrically in regard to the strip width and strip intervals.

Figure 7:
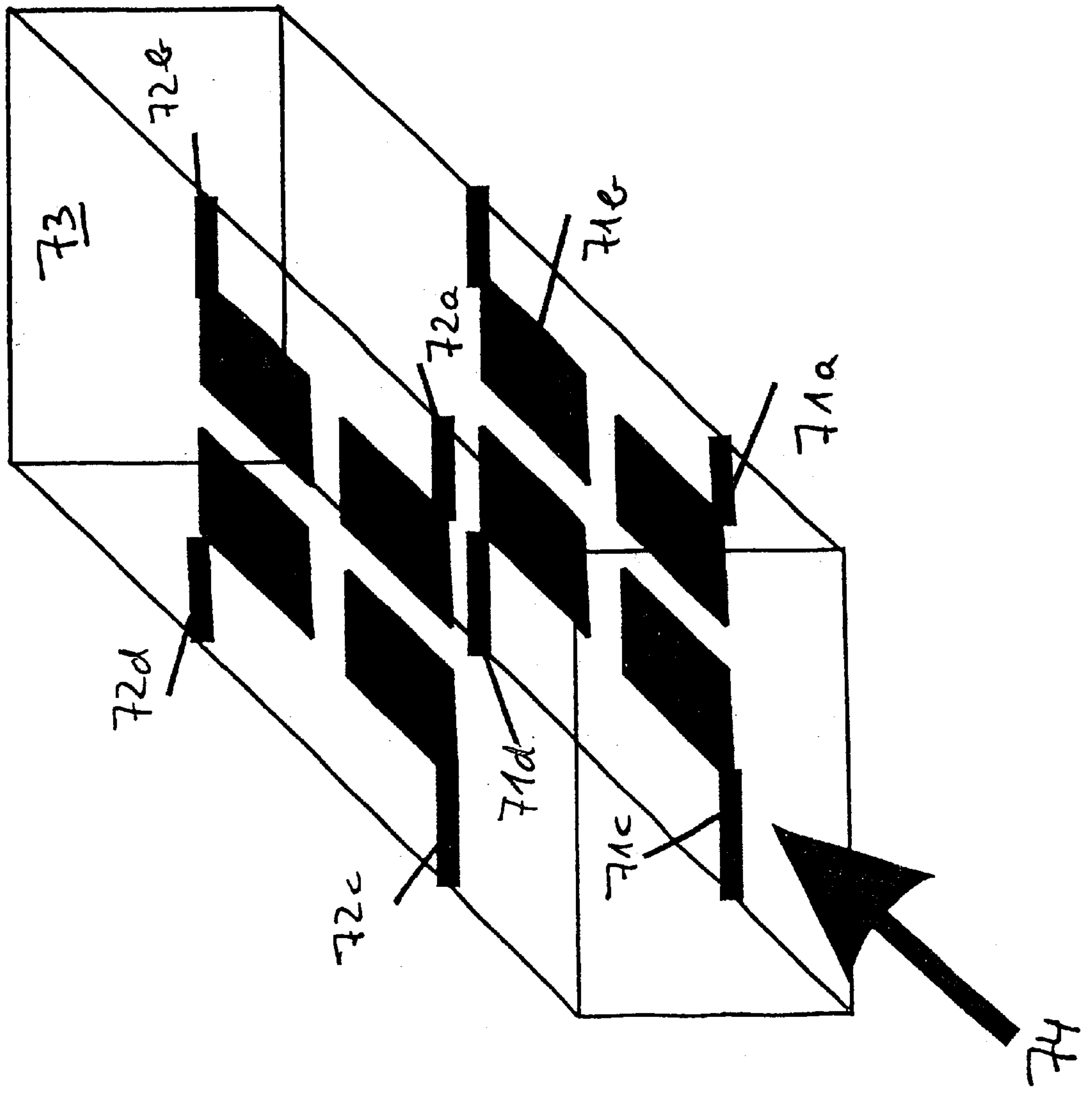

An electrode arrangement according to the invention can also comprise an octopole electrode arrangement according to FIG. 7. Two electrode groups are provided on opposing channel walls. The electrode groups on the bottom surface consist of four individually drivable rectangular electrode elements 71*a* to 71*d*. Opposite to these, the electrode groups on the cover surface consist of four individually drivable, rectangular electrode elements 72*a* to 72*d*. The fluid flowing through the channel 73 in the direction of the arrow 74 is preferably subjected to a rotating four-phase alternating field. An example of how this is generated is indicated in the following table:

| electrode/variant | 71a | 71b | 71c | 71d | 72a | 72b | 72c | 72d |
|---|---|---|---|---|---|---|---|---|
| 1 | 0° | 90° | 180° | 270° | 180° | 270° | 0° | 90° |
| 2 | 0° | 90° | 180° | 270° | 0° | 90° | 180° | 270° |
| 3 | 0° | 90° | 180° | 270° | floating | floating | floating | floating |

-continued

| electrode/variant | 71a | 71b | 71c | 71d | 72a | 72b | 72c | 72d |
|---|---|---|---|---|---|---|---|---|
| 4 | 0° | floating | 90° | floating | 270° | floating | 180° | floating |
| 5 | 0° | 0° | 270° | 270° | 90° | 90° | 180° | 180° |
| 6 | 0° | floating | floating | 270° | 90° | floating | floating | 180° |

The octopole arrangement can be modified in such a way that only four electrodes are provided, with the floating control then being left out.

The invention was described above to illustrate various forms of the electrode arrangement, with a field direction perpendicular to the flow direction always being assumed. Alignments deviating from this in the angular range mentioned initially can be realized with corresponding adjustment of the electrode elements and their arrangement. In each case, the individual electrode groups can be arranged offset to one another in the channel direction. The realization of the invention in channels with rectangular cross-section by application of the electrode arrangement to the wider channel walls is preferred, with altered geometrical designs also, however, possible. Instead of driving the electrodes with continuous, high frequency alternating current voltages as described, pulse-shaped driving is also possible. The electrodes can also comprise electrode elements which can be structured in relation to the flow direction and can be driven separately. The field direction can thereby be changed during the fluid circulation, e.g. to respond to the result of the circulation or to specific fluid properties.

Preferred applications of the invention are in all fields of the use of microsystems for biotechnological, medical, diagnostic, chemical technology, or pharmacological functions. An advantageous application of the invention in so-called DNA chips will be described in the following with reference to FIG. 8.

A DNA chip is generally a sample chamber with at least one modified surface. The modified wall surface has a predetermined molecular coating for formation of the substrate for DNA reactions. To construct specific DNA configurations, nucleotides are introduced into the sample chamber and caused to react with the substrate and/or DNA strands already grown. The reaction is accelerated by circulation of the fluid. However, the DNA strands which have already grown must also be prevented from separating from the modified wall surface. The process according to the invention for convective fluid movement can be advantageously used for this purpose.

Figure 8:
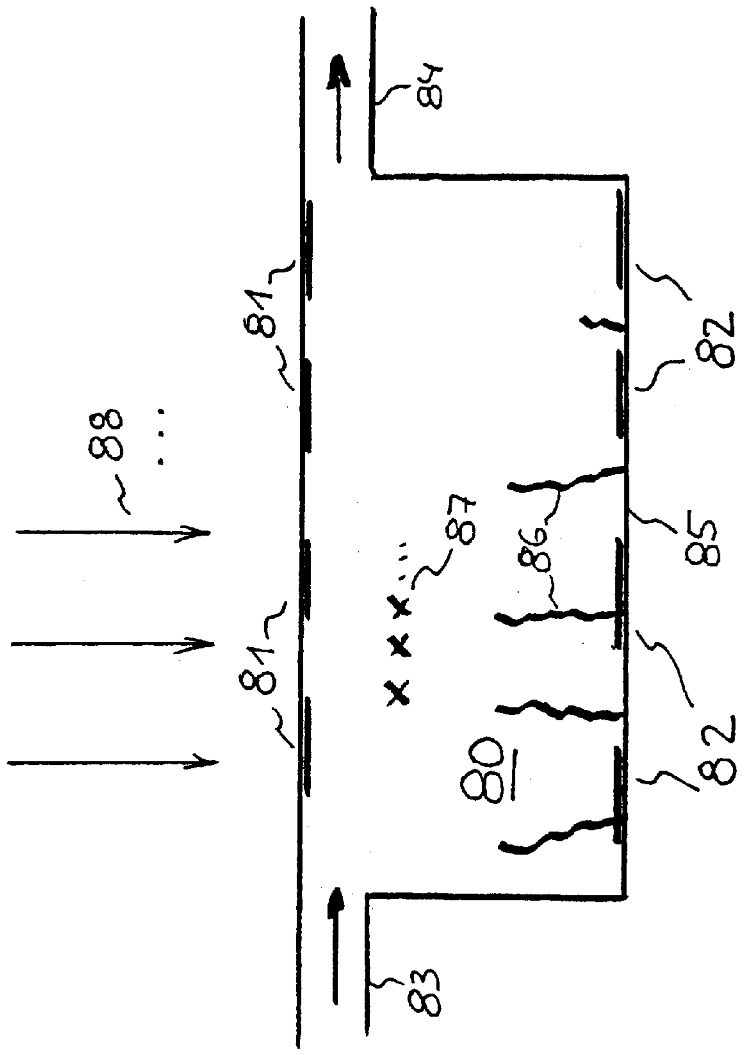

FIG. 8 shows a schematic cross-sectional view of the DNA chip 80, on whose inner wall electrode arrangements 81 and/or 82 are provided. The DNA chip has an inlet 83 and an outlet 84. The inner chip wall 85, which is on the bottom in the illustration, forms the surface-modified substrate for DNA growth. The DNA strands 86 (shown schematically) grow in the nucleotide solution introduced through the inlet 83 (direction of arrow). According to the principles explained above, electrical field gradients with an alignment deviating from the flow direction are generated with the electrode arrangements 81, 82. A blending of the nucleotide solution thereby results in the DNA chip 80. This blending can be locally delimited by producing optically induced thermal gradients in predetermined focal positions 87 of the laser irradiation 88, so that blending only occurs at the free ends of the DNA strands 86.

Blending in the entire DNA chip 80 can also, however, be provided. In each case, the circulation of the nucleotide solution supplied has the advantage that the speed of DNA synthesis is significantly increased.

The invention was described here with reference to flowing suspension fluids, but can also be correspondingly used in still fluids or swirled fluids. The invention was further described above with reference to embodiments, in each of which electrode arrangements were provided on opposing channel walls. According to an alteration, it is also possible to provide an electrode arrangement for generation of the field gradient(s) on only one channel wall.

What is claimed is:

1. A process for the convective movement of at least one fluid in the channel of a microsystem having a predetermined channel direction, wherein the fluid is subjected in at least one section of the channel to an electrical field gradient which is generated with electrical fields in the section according to a predetermined field direction, with the field direction deviating from the channel direction, and the fluid being moved under the effect of the field gradient in a direction deviating from the channel direction.

2. A process according to claim 1, wherein a thermal gradient is generated in the section of the channel simultaneously with the generation of the electrode field gradient.

3. A process according to claim 2, wherein the thermal gradient is generated with an electrode arrangement which is affixed to at least one channel wall in the section.

4. A process according to claim 2, wherein the thermal gradient is generated by a focused irradiation of the section of the channel.

5. A process according to claim 1, wherein the electric fields comprise travelling electric fields, whose direction of travel corresponds to the field direction, electrical field gradients with an alignment corresponding to the field direction, or alternating fields which are formed with field-generating electrodes aligned in the field direction.

6. A process according to claim 1, wherein an angle difference between the channel direction and the field direction selected is in the range from 60° to 120°.

7. A process according to claim 1, wherein several fluids flow through the channel simultaneously and are circulated in the section transverse or slanted to the flow direction and mixed with one another.

8. A process according to claim 7, wherein at least one of the fluids is a suspension with biological or synthetic microparticles.

9. A process according to claim 1, wherein the field direction in the section of the channel is varied depending on flow mechanical or material properties of the fluid.

10. A process according to claim 1, further comprising the steps of mixing of fluids, chemical treatment of microparticles in a suspension by a treatment solution, or circulation of a fluid flowing in a microsystem.

11. A device for convective movement of a fluid in a fluidic microsystem, comprising a channel with a predetermined channel direction in the microsystem, with an electrode arrangement being provided in at least one predetermined section in the channel and the electrode arrangement being set up to form an electrical field gradient along a predetermined field direction, wherein the electrode arrangement is formed in such a way that the field direction deviates from the channel direction.

12. A device according to claim 11, wherein the electrode arrangement comprises electrode groups or individual electrodes which are each affixed to at least one wall of the channel.

13. A device according to claim 12, wherein the electrode groups consist of electrode strips which extend over the length of the predetermined section in the lengthwise direction of the channel and are drivable individually.

14. A device according to claim 12, wherein the electrode groups or individual electrodes consist of flat electrode elements which are arranged in strip shapes in the section according to the field direction and which can be driven separately or jointly.

15. A device according to claim 14, wherein the electrode elements form rectangular, triangular, and/or arrow structures.

16. A device according to claim 12, wherein the electrode arrangement has meander or comb-shaped individual electrodes or octopole electrode arrangements.

17. A device according to claim 11, wherein the length of the predetermined section is smaller than or equal to a characteristic cross-sectional dimension of the channel structure.

18. A device according to claim 11, wherein an irradiation unit for generation of optical irradiation with a focus in the predetermined section is provided.

19. A device according to claim 18, wherein the irradiation unit is formed by at least one laser light source.

20. A device according to claim 11, being part of a fluidic microsystem or a DNA chip.

* * * * *

UNITED STATES PATENT AND TRADEMARK OFFICE

CERTIFICATE OF CORRECTION

PATENT NO. : 6,663,757 B1

DATED : December 16, 2003

INVENTOR(S) : Günter Fuhr et al.

It is certified that error appears in the above-identified patent and that said Letters Patent is hereby corrected as shown below:

Title page,
Item [12], "Führ et al." should read -- Fuhr et al. --.
Item [75], Inventors, "Günter Führ" should read -- Günter Fuhr --.

Signed and Sealed this

Eleventh Day of May, 2004

JON W. DUDAS
*Acting Director of the United States Patent and Trademark Office*